United States Patent [19]

Yasuda et al.

[11] Patent Number: 4,960,479
[45] Date of Patent: Oct. 2, 1990

[54] METHOD FOR MANUFACTURING AN AUTOMOBILE SUNVISOR

[75] Inventors: Yoshikazu Yasuda; Kazuaki Tsubota; Shiro Tanimoto, all of Hiroshima, Japan

[73] Assignee: Delta Kogyo Co., Ltd., Hiroshima, Japan

[21] Appl. No.: 469,672

[22] Filed: Jan. 22, 1990

Related U.S. Application Data

[63] Continuation of Ser. No. 7,192,705, May 11, 1988, abandoned.

[30] Foreign Application Priority Data

May 15, 1987 [JP] Japan .................................. 62-119847
Oct. 28, 1987 [JP] Japan .................................. 62-274024

[51] Int. Cl.⁵ .......................................... B32B 31/18
[52] U.S. Cl. .................................... 156/251; 156/267; 156/274.4; 156/275.1; 156/380.7; 156/380.8; 156/515
[58] Field of Search ............... 156/380.7, 380.6, 380.8, 156/274.4, 251, 515, 73.3, 267, 213, 219; 219/10.81

[56] References Cited

U.S. PATENT DOCUMENTS

| | | | |
|---|---|---|---|
| 2,076,079 | 4/1937 | Gammeter | 156/251 |
| 2,510,383 | 6/1950 | Dalgleish | 219/10.81 |
| 2,686,556 | 8/1954 | Gerber et al. | 156/380.7 |
| 3,025,206 | 3/1962 | Scholl | 156/267 X |
| 3,099,596 | 7/1963 | Prew | 156/380.7 |
| 3,638,522 | 2/1972 | Bolli | 156/515 X |
| 3,790,420 | 2/1974 | Jenei | 156/515 X |
| 3,816,216 | 6/1974 | Takei | 156/380.7 |
| 3,901,759 | 8/1975 | Highfield et al. | 156/515 |
| 4,024,010 | 5/1977 | Boccia | 156/251 X |
| 4,693,771 | 9/1987 | Payet et al. | 156/73.3 |
| 4,743,328 | 5/1988 | Zwirner | 156/380.7 X |

FOREIGN PATENT DOCUMENTS 61-270139 5/1985 Japan ................................. 156/274.4

*Primary Examiner*—Michael W. Ball
*Assistant Examiner*—Michele K. Yoder
*Attorney, Agent, or Firm*—Burns, Doane, Swecker & Mathis

[57] ABSTRACT

The present invention provides a method for manufacturing an automobile sunvisor, wherein a pair of overcoatings for the sunvisor, the rear surface of which is respectively covered with a layer of thermoplastic resin, is pressure-welded between an upper electrode member and a lower electrode member and cut at the same position without displacement, thus forming no protruding welded portion in the periphery of the sunvisor. Moreover, the pair of the overcoatings can be securely welded to each other without any particular portion for welding prepared in the overcoatings because the thermoplastic resin is melted inside the sealed portion of the pair of overcoatings during the pressure-welding.

1 Claim, 6 Drawing Sheets

METHOD FOR MANUFACTURING AN AUTOMOBILE SUNVISOR

This application is a continuation of application Ser. No. 192,705, filed May 11, 1988 now abandoned.

BACKGROUND OF THE INVENTION

1. Field of the Invention

The present invention relates to a method for manufacturing an automobile sunvisor covered with a pair of overcoatings made of a thermoplastic resin.

2. Description of the Prior Art

In a conventional method for manufacturing an automobile sunvisor of the type referred to above, such as disclosed in Japanese Patent Laid-open Publication Tokkaisho No. 55-59016 (59016/1980), the sunvisor has been generally manufactured in two processes, namely, in welding process and in cutting process, with the employment of an upper mold a and a lower mold b confronting each other as shown in FIG. 5. The aforementioned upper mold a is comprised of a press mold c and a cutting mold d in such construction that the press mold c which is outfitted in the press mold c are urged by a spring in a direction to be separated from each other. When the upper mold a is lowered, the press mold c and the lower mold d which is a lower electrode member press the outer periphery of the overcoating from above and below, and weld the pair of the overcoatings by a high-frequency welder. Then, the further lowering the upper mold a against the force of the spring, the periphery of the welded portion of the overcoating is cut by the cutting mold d and the lower mold b.

Since it has been so arranged according to the above-described conventional manufacturing method that the overcoating was cut along the outer periphery of the press mold c, the sunvisor was manufactured in such a shape as shown in FIG. 6 that a welded portion f having the height corresponding to the width of the press portion e of the press mold c (for example, approximately 2 mm) protrudes in the periphery of the sunvisor, resulting in bad appearance of the sunvisor.

SUMMARY OF THE INVENTION

Accordingly, an essential object of the present invention is to provide an improved method for manufacturing an automobile sunvisor, ensuring good appearance of the sunvisor, with an aim to substantially eliminating the above-described disadvantage inherent in the prior art.

In accomplishing the above-described object, according to the present invention, a manufacturing method of an automobile sunvisor is provided by which the outer peripheries of a pair of the overcoatings, each having a layer of thermoplastic resin formed on the rear surface thereof, are added pressure by an upper electrode member and a lower electrode member so as to be welded with each other. A blade edge having a sharpened tip is formed in the upper electrode member along the outer periphery of the overcoating. Moreover, the blade edge has a slope of a minute width formed at the inner side thereof. The pair of overcoatings is welded between the slope of the blade edge and the flat surface of the lower electrode member confronting the slope, and then cut 1, further depression of the blade edge.

According to the manufacturing method of the automobile sunvisor described above, the blade edge is made of a material harder than that of the lower electrode member.

In the construction as described above, the outer periphery of the pair of the overcoatings is pressure-welded between the blade edge of the upper electrode member and the lower electrode member, and moreover, the pair of the overcoatings is cut at the right position where it is welded, thus forming no welded portion which would protrude in the periphery of the sunvisor manufactured in the conventional method. Furthermore, when the pair of the overcoatings is pressure-welded by the blade edge and the lower electrode member, thermoplastic resinous material is melted out and cooled inside the sealed portion of the pair of the overcoatings, and therefore the pair of the overcoatings can be integrally formed without forming the welded portion as in the prior art.

Moreover, since the blade edge of the upper electrode member is made of a material harder than the lower electrode member, the tip end of the blade edge is able to grasp the pair of the overcoatings so tightly as if it bit into the side of the lower electrode member, so that the welding and cutting of the pair of the overcoatings can be carried out with high certainty and uniformity.

BRIEF DESCRIPTION OF THE DRAWINGS

These and other objects and features of the present invention will become clear from the following description taken in conjunction with the preferred embodiments thereof with reference to the accompanying drawings, in which.

DETAILED DESCRIPTION OF THE INVENTION

Figure 1:
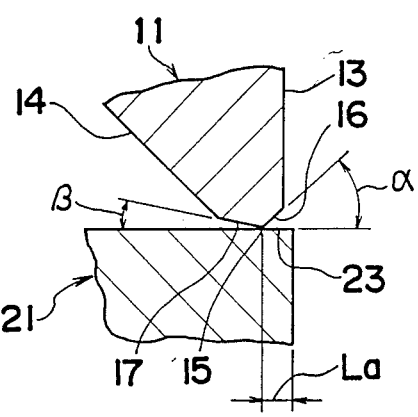
FIG. 1 is an enlarged view of I part of FIG. 2 showing a manufacturing machine employed for embodying the present invention.

Before the description of the present invention proceeds, it is to be noted here that like parts are designated by like reference numerals throughout the accompanying drawings.

Figure 2:
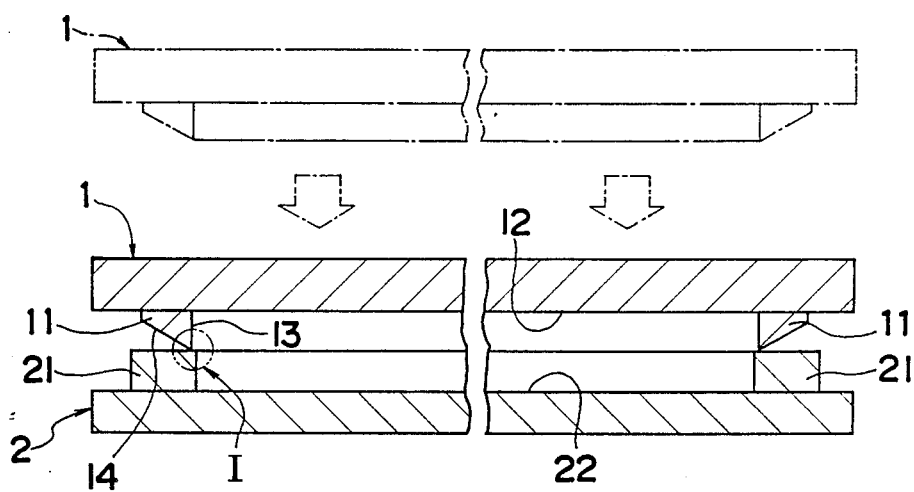
FIG. 2 is a schematic vertical cross sectional view of the manufacturing machine of FIG. 1.

Referring to FIG. 2, an upper electrode member 1 confronting a lower electrode member 2 is vertically movable with respect to the lower electrode member 2.

A receiver seat 21 is protrudingly formed along the outer periphery of a sunvisor on the upper surface of the lower electrode member 2, and a cutting blade 11 is protrudingly formed on the lower surface of the upper electrode member 1 in a manner to confront the receiver seat 21. Thus, the cutting blade 11 and the receiver seat 21 form recesses 12 and 22 in the surface where the pair of the electrode members 1 and 2 face each other, for accommodating the sunvisor therein. The pair of the upper and lower members 1 and 2 constitute a pair of the upper and lower molds as shown in FIG. 3 in which the sunvisor 3 is shown in the state cut in half in a thickness direction.

The cross section of the cutting blade 11 is of a downwardly sharpened shape as a whole formed by a vertical inner wall face 13 constituting the recess 12 and an outer slope 14. As shown in FIG. 1, in a very small portion at the tip of the cutting blade 11, and inside slope (with a minute width) 16 having an angle $\beta$ with respect to the upper end surface of the receiver seat 21 is formed to cross an outside slope 17 having an angle 8 with respect to the upper end face of the receiver seat 21. The intersection of these slopes 16 and 17 forms a blade edge 15 which is so arranged as to be brought in contact with the receiver seat 21 at a position slightly outwards by the distance La from the inside upper edge of the receiver seat 21 (for example, approximately 0.5-0.7 mm). Accordingly, the welding operation with application of pressure and the cutting operation are carried out by the blade 11 of the upper electrode member 1 and the receiver seat 21 of the lower electrode member 2 at the position where the blade edge 15 is contacted with the receiver seat 21.

Although it may be possible that the cutting blade 11 is made of a material having the same hardness as that of the receiver seat 21, it is preferable that the cutting blade 11 is made of a material harder than that of the receiver seat 21. The favorable angle $\alpha$ is about 45°, while the favorable angle $\beta$ is about 20°. It is to be noted here that the angles $\alpha$ and $\beta$, and the above-mentioned distance La may be determined depending on the hardness of the materials of the cutting blade 11 and the receiver seat 21, and the type of the material of the overcoating for the sunvisor 3.

Figure 3:
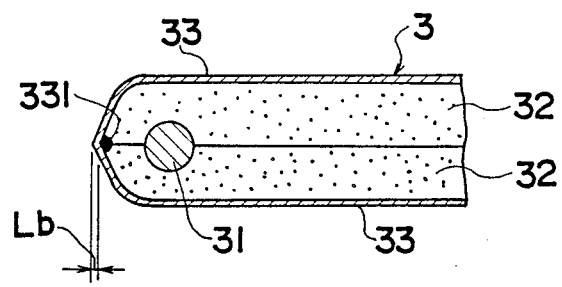
FIG. 3 is a cross sectional view, partly on an enlarged scale, of a sunvisor manufactured by the manufacturing machine of FIG. 2.

In order to manufacture the sunvisor with the employment of the machine of the above-described construction, first, a core member 31 is sandwiched by a cushion material 32 as shown in FIG. 3. Then, the upper and lower surfaces of the cushion material 32 are covered with a pair of overcoatings 33 made of thermoplastic resin. The thus-obtained object is placed in the recess 22 of the lower electrode member 2 shown in FIG. 2, with the upper electrode member 1 being lowered. Then, the outer periphery of the overcoating is held between the blade edge 15 and the receiver seat 21, so that the overcoating is welded through high-frequency heating while it is applied with such depressing force as not to be cut out by the blade edge 15 (e.g., about 9 kg/cm$^2$). After a predetermined cooling time has passed, the blade edge 15 is further depressed (with the depressing force, for example, about 20 kg/cm$^2$), thereby cutting the overcoating 33 at the position of the blade edge 15 indicated in FIG. 1. It is to be noted here that the depressing force in the above-described cutting process may be set in accordance with the material and the thickness of the overcoating to be cut and the peripheral length of the portion cut in the overcoating. For example, in the case where the overcoating made of polyvinyl chloride and having a thickness of 0.3-0.4 mm is employed, about 16 kg depressing force may be enough to be added per 1 mm of the peripheral length of the cut portion. Therefore, when the peripheral length of the cut portion is 960 mm, the depressing force may be about 15 kg/cm$^2$. If the peripheral length is 1200 mm, 1300 mm and 1450 mm, the depressing force may be approximately 19 kg/cm$^2$, 21 kg/cm$^2$ and 23 kg/cm$^2$, respectively.

In the manner as described above, the pair of the overcoatings 33 is grasped to be welded between the inside slope 16 of the blade edge 15 and the flat surface 23 having the width La on the receiver seat 21. The first angle $\alpha$ is designed such to retain the bead of thermoplastic resin so as to secure the welding of the pair of overcoatings by a predetermined protruded width. When the overcoating 33 is cut at the position of the blade edge 15, there is formed a welded portion in the overcoating 33 where the pair of the overcoatings meet one another as shown in FIG. 3. Accordingly, the protruded width Lb of the welded portion formed in the outer periphery of the sunvisor 3 can be reduced to be approximately, for example, 0.2-0.5 mm. On the whole, therefore, the outer periphery of the sunvisor 3 appears round, resulting in an improved appearance and an improved touch of the sunvisor.

Since the pair of the overcoatings 33 is welded to each other at the sealed portion because of the material 331 melted inside the sealed portion as shown in FIG. 3, the pair of the overcoatings 33 can be integrally formed even when two faces, each having a predetermined width of the overcoatings, are not welded to form a welded portion as in the prior art.

Figure 7:
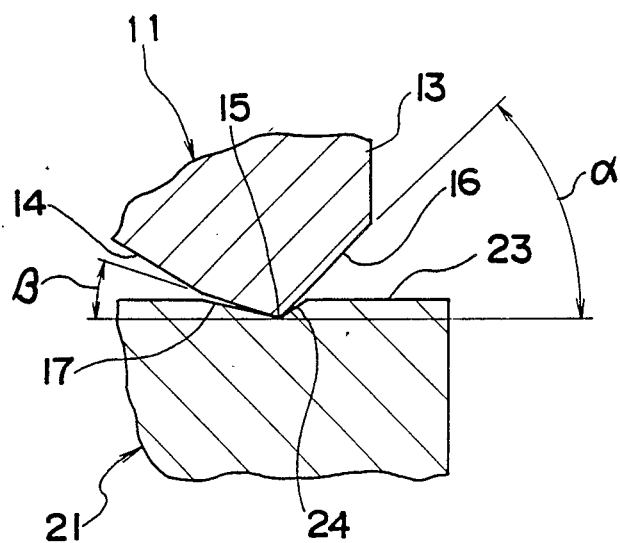
FIG. 7 is an enlarged view, corresponding to FIG. 1, of a modified manufacturing machine employed in the present invention.

A V-shaped groove 24 having a slightly larger interior angle than the blade edge 15 with a very small depth (for example, 0.1 mm deep) may be formed in the receiver seat 21 at the position where the blade edge 15 comes in touch with the receiver seat 21, as shown in FIG. 7. Thus, the welding intensity of the welded portion of the overcoatings 33 can be further increased by grasping the pair of the overcoatings 33 between the groove 24 and the blade edge 15.

For the overcoating 33, various kinds of materials such as a sheet, the surface of which is formed in leather-like or cloth-like fashion by thermoplastic resin, or a woven cloth, the rear surface of which is laminated with polyvinyl chloride, can be used, if only at least the rear surface of the overcoating 33 is made of thermoplastic resin.

Figure 4:
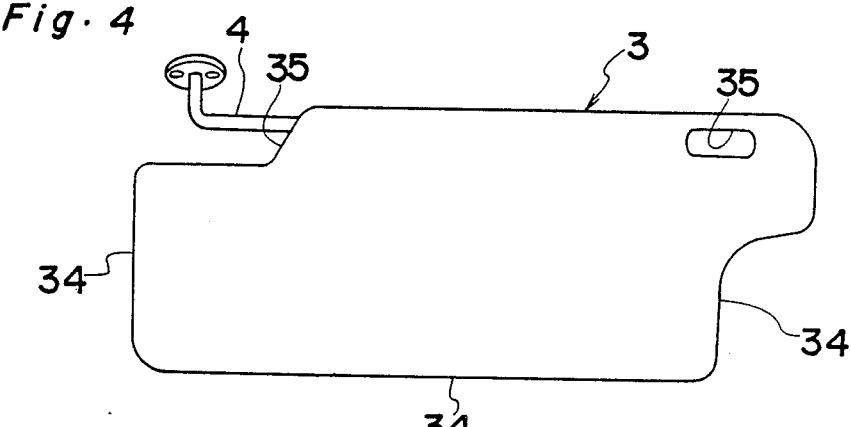
FIG. 4 is a front elevational view of a general sunvisor.
Figure 5:
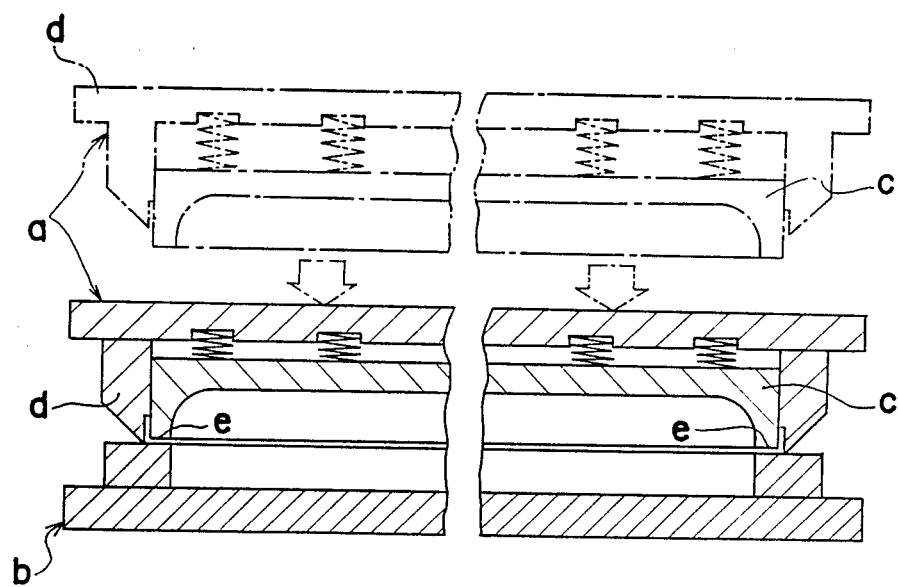
FIG. 5 is a schematic vertical cross sectional view of a machine employed in a prior art manufacturing method of a sunvisor.

Referring to the sunvisor 3 shown in FIG. 4, since an outer periphery 35, in the vicinity of the portion of the sunvisor where the sunvisor is fixed to the inside of the automobile, tends to be affected by a larger tearing force acting on the welded portion by an overcoating 33, the protrusion width Lb of the welded portion at the outer periphery 35 may be set larger than that at an outer periphery 34 at a driver's operating side, thereby to reinforce the outer periphery 35.

Figure 8:
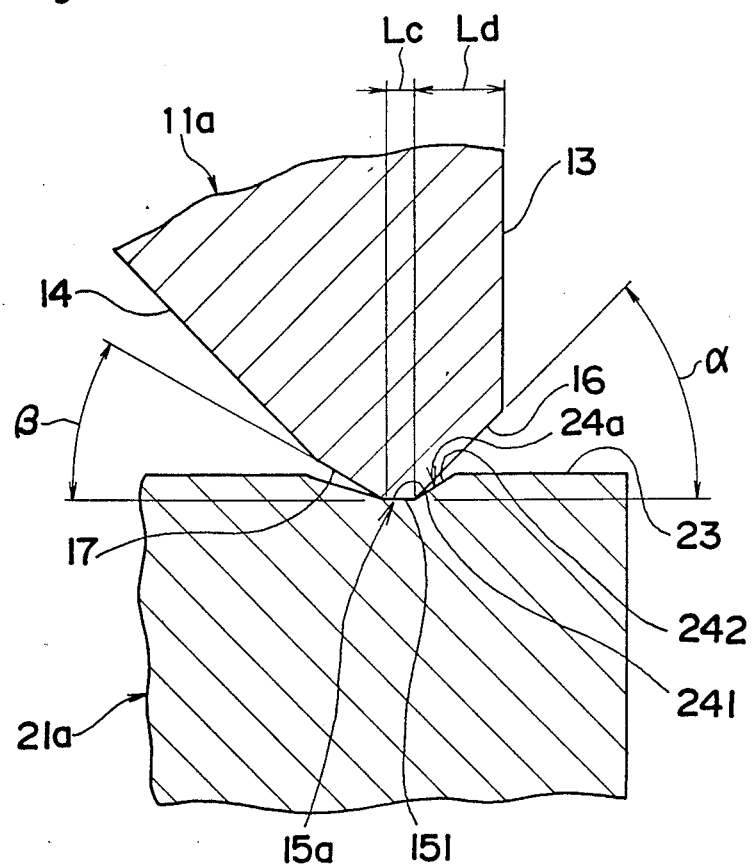
FIG. 8 is an enlarged view, corresponding to FIG. 1, of a manufacturing machine employed in the second embodiment of the present invention.

FIG. 8 shows the second embodiment of the present invention employing a machine in which the shape of the very small portion at the tip of the cutting blade 11 and also the receiver seat 21 confronting the small portion is made different from the shape of those in the first embodiment shown in FIG. 1. In the second embodiment of FIG. 8, a cutting blade 11a has a blade edge 15a formed at the very small portion of the tip thereof. The blade edge 15a has a straight portion 151 which has a small width Lc (for example, 0.1 mm), intersecting the inside slope 16 at the inner peripheral edge and the outside slope 17 at the outer edge thereof. In a receiver seat 21a is formed a recessed groove 24a with a small depth (for example, about 0.1 mm deep). The groove 24a generally of a V-shaped configuration has an interior angle slightly larger than the angle formed by the inside slope 16 and the outside slope 17. Moreover, the groove 24a has a flat portion 241 contacting the straight portion 151 at the bottom thereof.

For making the cutting blade 11a harder than the receiver seat 21a, the cutting blade 11a is made of an alloy tool steel (SKS, JIS4404) having Rockwell hardness $H_{RC}$ of about 58, and the receiver seat 21a is made of a carbon tool steel (SK3, JIS4401) having Rockwell hardness of about 22, for example. It is to be noted here that the kind of the steel and the hardness of the steel may be set in accordance with the shape of the blade edge 15a, the material and the thickness of the overcoating 33, and the peripheral length of the cut portion of the overcoating 33.

The manufacturing method of the sunvisor with the employment of the machine having the above-described construction will be explained hereinbelow. By lowering the upper electrode member 1, the outer periphery of the pair of the overcoatings 33 is grasped between the blade edge 15a and the groove 24a of the receiver seat 21a. Then, the minute portion held by the straight portion 151 and the flat portion 241 is welded through high-frequency heating under the condition that such depressing force as not to cut the overcoating 33 (for example, about 9 kg/cm$^2$) is added. Thereafter, the high-frequency depressing force (for example, about 20 kg/cm$^2$) is added to the blade edge 15a. Consequently, the straight portion 151 is brought in contact with the flat portion 241, thereby cutting the pair of the overcoatings 33. Then, the manufacturing process will be completed by cooling operation. The depressing force in the above two steps may be arranged with consideration to the material and the thickness of the overcoating 33 or the peripheral length of the cut portion of the overcoating 33.

In the above manufacturing process of the sunvisor, the material of the small width portion grasped by the straight portion 151 and the flat portion 241 is melted during the welding process, and then the distance between the blade edge 15a and the groove 24a is further reduced in the cutting process, and finally the straight portion 151 comes into contact with the flat portion 241 as shown in FIG. 8. The melted material 331 is discharged inside the sunvisor, namely, in the cushion side, by the inside slope 16 and the upper surface of the receiver seat 21a, so that the end surfaces and rear surfaces of the sealed portion of the overcoatings 33 are welded respectively with each other by the melted material 331 (with reference to FIG. 3). In the cutting process, such force is arranged to be brought about that leads the melted material into the rear side of the overcoating 33 along an acute face formed by the inside slope 16 and an inner wall slope 242 of the groove 24a, which is larger than in the case where the force is generated only by the face formed by the inside slope 16 and the flat surface 23. Accordingly, the strength of the welded portion of the overcoating 33 can be larger than in the case of the first embodiment shown in FIG. 1

Since the cutting blade 11a is harder than the receiver seat 21a, the blade edge 15a comes into contact with the receiver seat 21a in the cutting process in a manner as if the blade edge 15a bit into the receiver seat 21a. Therefore, the cutting cut of the pair of the overcoatings 33 can be assured. At the same time, even if the thickness of the overcoatings 33 is uneven, the overcoatings 33 can be uniformly cut out. Moreover, as compared with the case where both the cutting blade 11a and the receiver seat 21a are made of relatively hard material, the blade edge 15a can be less worn out or damaged thereby enhancing durability of the manufacturing machine.

Example

A sample of the sunvisor is manufactured using the cutting blade 11a and the receiver seat 21a of FIG. 8 formed in the following manner.

More specifically, the width Lc of the straight portion 151, the width Ld of the inner slope 16, the angle $\alpha$, the angle $\beta$, and the depth of the groove 24a are respectively set to be 0.1 mm, 0.3mm, 45°, 32° and 0.1 mm. The width of the flat portion is set to be the same as the width Lc. Further, the cutting blade 11a is made of SKS steel which has Rockwell hardness $H_{RC}$ of about 58, while the receiver seat 21a is formed by SK3 steel having Rockwell hardness $H_{RC}$ to be about 22.

For the overcoating 33, two kinds of overcoatings are employed, that is, an overcoating of 0.3 mm thickness which is obtained by laminating the rear surface of a woven cloth with polyvinyl chloride, and an overcoating of 0.4 mm thickness which is obtained by forming polyvinyl chloride into cloth-like material. It is to be noted here that the peripheral length of the welded portion or the cut portion of the overcoating 33 is 1300 mm. It is also to be noted that foam urethane of 8 mm in thickness is used for the cushion material 32.

The welding process is carried out with the depressing force of 9 kg/cm$^2$ added, through high-frequency heating for 4 seconds. Then, the cutting process is performed, subsequent to the welding process, with the depressing force of 21t added to 1.5 seconds. Thereafter, the cooling process follows for 2.5 seconds.

Figure 6:
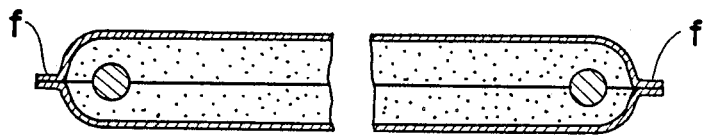
FIG. 6 is a cross sectional view of a sunvisor manufactured in the prior art manufacturing method.

As a result, the width Lb of the protrusion in the welded portion of FIG. 3 becomes 0.2–0.5 mm, and the exfoliation strength of the welded portion becomes 3.5–4.0 kg/cm$^2$ per every 10 mm in length. Accordingly, the protrusion f present in the outer periphery of the prior art sunvisor of FIG. 6 is almost eliminated. At the same time, the strength of the sealed portion of the overcoating can be sufficiently increased.

In the foregoing example, the depressing force in the welding process is preferably $9\pm1.0$ kg/cm$^2$. If the depressing force in the welding process is below the above level, the strength of the welded portion is decreased. On the contrary, if the depressing force in the welding process is larger than the above level, it is feared that the woven cloth of the overcoating 33 takes fire. Meanwhile, the depressing force in the cutting process can be selected in the range larger than 16 kg per every 1 mm cutting length. When the depressing force in the cutting process is lower than the above-described range, cutting is not sufficiently effected.

Figure 9:
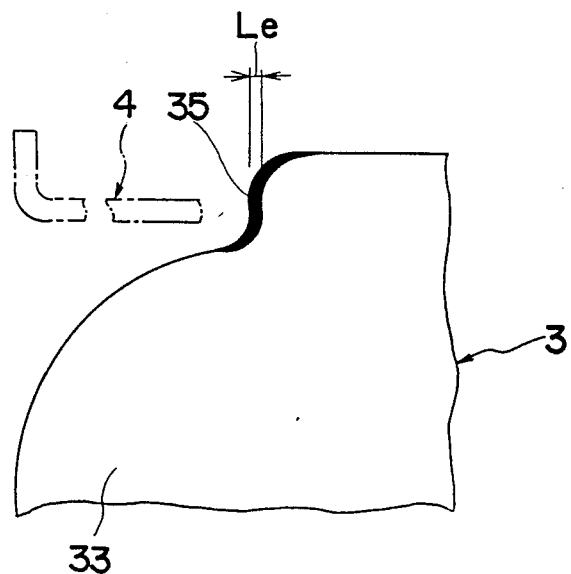
FIG. 9 is a view of a welded portion of the sunvisor where a stay is fixed.

Also in the foregoing example, as shown in FIG. 9, the welded portion is formed in the outer periphery 35 in such a manner as to make the welding with Le, which gradually changes from the opposite ends of the outer periphery 35, to be about 2 mm at the maximum, thereby reinforcing the outer periphery 35 where the stay 4 is inserted. The shape of the portion of the cutting; blade 15a and the receiver seat 21a corresponding to the outer periphery 35 is changed in order to form the welded portion.

Figure 10:
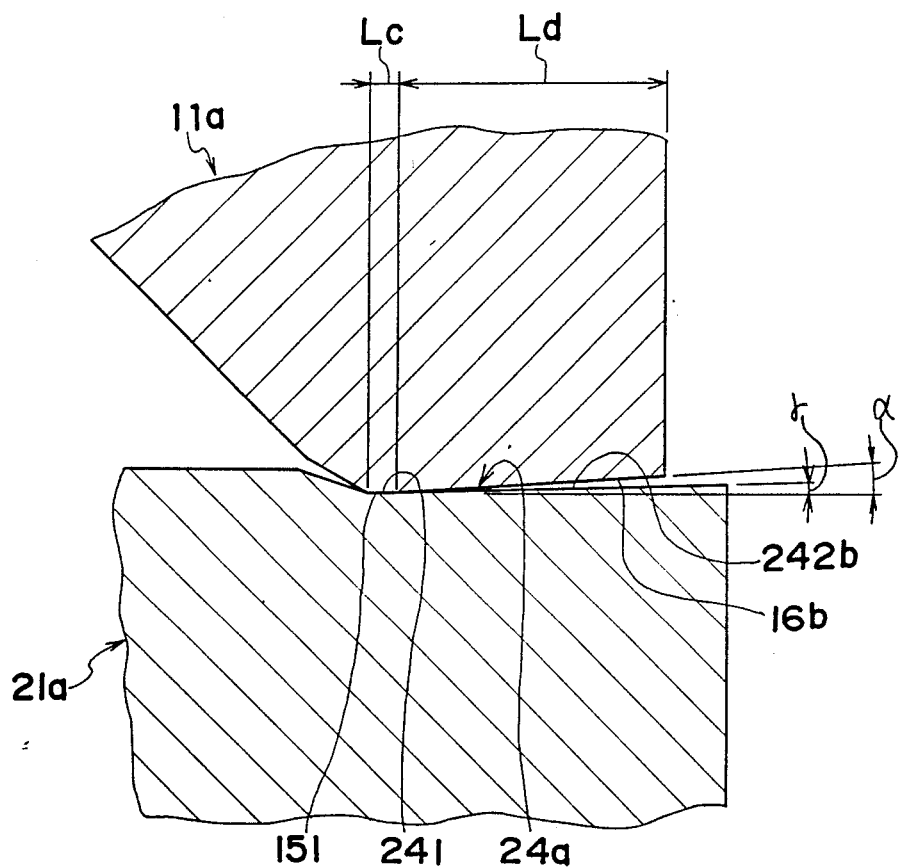
FIG. 10 is an enlarged view, corresponding to FIG. 1, of a manufacturing machine for forming the welded portion of FIG. 1.

In FIG. 10, there is shown a cross section of the cutting blade 11a and the receiver seat 21a of the portion corresponding to the maximum width Le. The cutting blade 11a has an inside slope 16b following the straight portion 151 (Lc=0.1 mm) which has an angle $\alpha$ of 0°40′ with respect to the horizon and the width Ld of 2 mm. In the receiver seat 21a confronting the inside slope 16b, an inner wall slope 242b following the flat portion 241 of the groove 24a is formed with an angle $\lambda$ with respect to the horizontal face being set to be 0°20′, running to the inner end of the receiver seat 21a. The groove 24a between the cutting blade 15a and the receiver seat 21a is designed in the manner that the largest cross section thereof shown in FIG. 10 gradually changes to the cross section shown in FIG. 8.

Because of the arrangement as described above, when the stay 4 is pressed into the sunvisor 3 while the sunvisor is assembled, the overcoating 33 can be prevented from being torn out even though a relatively large tearing force affects the sealed portion of the overcoating 33.

As described hereinabove, in the manufacturing method of an automobile sunvisor according to the present invention, both the pressure welding and the cutting operations are carried out at the same position by the cutting blade formed in the upper electrode member, and accordingly no protrusion is produced in the welded part in the periphery of the sunvisor, not like in the prior art. Therefore, the manufactured sunvisor can be of good appearance and good touch.

Moreover, the melted thermoplastic resin is guided inside the sealed portion of the overcoatings by the slope with small width formed in the blade edge and the flat surface of the lower electrode member confronting the slope, thereby to weld the rear surfaces of the sealed portion to each other. Accordingly, without the welded portion formed by the surfaces of the overcoatings as in the prior art, the pair of the overcoatings can be securely welded into one unit.

In addition, according to the second embodiment of the present invention, since the blade edge is made of a material harder than the lower electrode member, the end of the blade edge can grasp the pair of the overcoatings so much as to almost bite into the side of the lower electrode member, resulting in assured and uniform welding and cutting of the pair of the overcoatings.

Although the present invention has been fully described in connection with the preferred embodiments thereof with reference to the accompanying drawings, it is to be noted that various changes any modifications are apparent to those skilled in the art. Such changes and modifications are to be understood as included within the scope of the present invention as defined by the appended claims unless they depart therefrom.

What is claimed is:

1. A method for manufacturing an automobile sunvisor by compressing a pair of overcoatings between an upper electrode member and a lower electrode member to form a bead of thermoplastic resin along an inside edge of an outer periphery of the overcoatings wherein a blade edge having a sharpened tip with an inside slope and outside slope is formed in said upper electrode member along the outer periphery of said pair of overcoatings, said inside slope forming a first angle with respect to a receiver seat positioned on said lower electrode member and said outside slope forming a second angle with respect to said receiver seat, said first angle being larger than said second angle, said method comprising the steps of welding the pair of overcoatings between said inside slope and a flat surface of said lower electrode member confronting the inside slope; cutting said pair of overcoatings at a position where said blade edge is in substantially continuous contact with said receiver seat and along a length with the application of a depressing force having a predetermined force per every 1 mm unit of the length cut subsequent to being welded with application of the depressing force in the range of $9\pm1.0$ kg/cm$^2$; and, retaining said bead of thermoplastic resin in the first angle so as to secure the welding of said pair of overcoatings by a predetermined protruded width.

* * * * *